(12) United States Patent
Zelleröhr et al.

(10) Patent No.: US 7,179,074 B2
(45) Date of Patent: Feb. 20, 2007

(54) DEVICE FOR SAFEGUARDING AN OPEN POSITION OF THE CLOSING UNIT OF AN INJECTION MOLDING MACHINE

(75) Inventors: Michael Zelleröhr, Kleve (DE); Friedrich Staudacher, Eichenau (DE)

(73) Assignee: Krauss-Maffei Kunststofftechnik GmbH, München (DE)

( * ) Notice: Subject to any disclaimer, the term of this patent is extended or adjusted under 35 U.S.C. 154(b) by 0 days.

(21) Appl. No.: 10/325,679

(22) Filed: Dec. 23, 2002

(65) Prior Publication Data

US 2003/0143299 A1 Jul. 31, 2003

(30) Foreign Application Priority Data

Dec. 21, 2001 (DE) ................. 101 63 442

(51) Int. Cl.
*B29C 45/84* (2006.01)
(52) U.S. Cl. ................... 425/151; 425/153
(58) Field of Classification Search ........... 425/151, 425/153
See application file for complete search history.

(56) References Cited

U.S. PATENT DOCUMENTS

| 3,728,057 | A |   | 4/1973  | Grundmann et al. |
| 5,834,036 | A |   | 11/1998 | Ueno |
| 6,164,947 | A | * | 12/2000 | Miyahara ................ 425/151 |

FOREIGN PATENT DOCUMENTS

| DE | 138 750    |   | 11/1979 |
| DE | 30 42 712  | A | 6/1982  |
| JP | 01 087321  | A | 3/1989  |

\* cited by examiner

*Primary Examiner*—Tim Heitbrink
(74) *Attorney, Agent, or Firm*—Henry M. Feiereisen; Ursula B. Day

(57) ABSTRACT

Injection molding machines must be provided with devices which ensure that the mold mounting plates when in open position cannot inadvertently close, wherein the conventional safety devices include a toothed locking bar disposed between two mold mounting plates and are provided with a ratchet mechanism, but which obstructs accessibility in the space between the two mold mounting plates, so that according with the present invention a blocking unit is disposed outside the space between two mold mounting plates for engagement of the drive unit of the closing unit to thereby prevent an inadvertent closure.

13 Claims, 3 Drawing Sheets

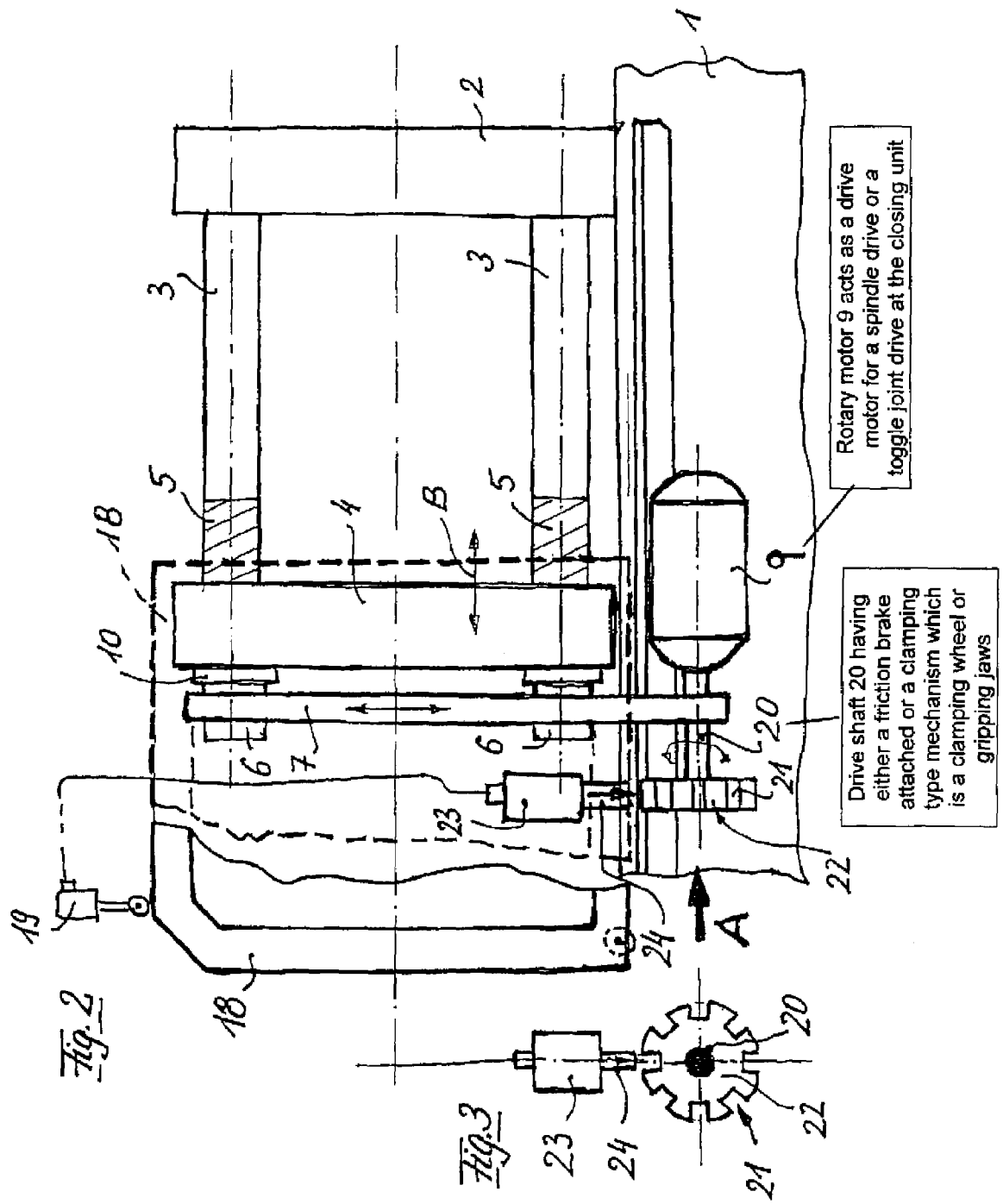

DEVICE FOR SAFEGUARDING AN OPEN POSITION OF THE CLOSING UNIT OF AN INJECTION MOLDING MACHINE

CROSS-REFERENCES TO RELATED APPLICATIONS

This application claims the priority of German Patent Application, Serial No. 1 016 3442.0-16, filed Dec. 21, 2001, pursuant to 35 U.S.C. 119(a)–(d), the disclosure of which is incorporated herein by reference.

BACKGROUND OF THE INVENTION

Field of the Invention

The present invention relates to a safety device for a mold closing unit of an injection molding machine and in particular, a device for safeguarding a mold closing unit of an injection molding machine in open position (safety device) against inadvertent closing.

Injection molding machines include at least two mold mounting plates, with one mold mounting plate fixedly anchored upon a machine bed and with the other mold mounting plate moveable relative thereto. The mold mounting plates carry respective half-molds. Opening and closing of the cavity involves a displacement of the moving mold mounting plate relative to the fixed mold mounting plate controlled by a mold closing unit.

The mold closing units known in the prior art include a toothed locking bar attached to the moveable mold mounting plate and penetrating the opposite facing stationary mold mounting plate through an opening. A control element is disposed at the opening for controlling the engagement of a pawl with the toothed locking bar wherein the pawl is movable into and out of engagement with the notches of the locking bar. The control element is activated by the positioning signals of a switch, which is actuated by the protective door when the protective door has reached open position. This type safety device requires relatively high expenditures with respect to mechanics and maintenance and in addition, the device itself also impedes accessibility to the space between the two mold mounting plates. Thus, the safety device of the prior art suffers from serious drawbacks to the operation of the molding machine, in particular, for example it negatively impacts the changing of tools when required and also the arrangement of devices necessary for handling intermediary steps in the operation of the mold.

It would therefore be desirable and advantageous to provide an improved device for securing the closing unit of an injection molding machine by simple means, which obviates prior art shortcomings by preventing an inadvertent closing of the closing unit and to thereby realize improved security of operation as well as retaining good accessibility between the two mold mounting plates.

SUMMARY OF THE INVENTION

According to one aspect of the present invention, a device for securing the closing unit of an injection molding machine against inadvertent closing of the closing unit (safety device) includes a mechanical blocking unit for retaining the mold mounting plate in an open position that is self-activating upon opening the protective door of the safety jacket of the injection molding machine, and wherein the blocking unit, which includes a clamping locking mechanism with controllable clamping jaws, is disposed in the drive unit operating the closing unit and outside of the space between the mold mounting plates.

The present invention resolves prior art problems by controlling the motion of the movably mounted mold mounting plates already at the point of the drive unit, preferably directly at the drive shaft of the motor of the drive unit so as to block movement of the movable mounting plate. Accordingly, in case an inadvertent closing motion must be blocked, the movable parts of the closing unit, such as the movable mounting plate and the essential elements of the drive unit associated with the movable mounting plate, for example a spindle- or toggle joint drive, remain unstressed.

According to another feature of the present invention, asymmetrical stresses that can occur in devices of the prior art in the closing units due to the arrangement of the locking bar in an off-center disposition between the two mold mounting plates, can be prevented.

According to another feature of the present invention, the blocking unit can be disposed directly at the drive shaft of the rotary motor and includes a ratchet mechanism with a controllable pawl.

In a preferred embodiment, the ratchet mechanism is a ratchet wheel disposed at the drive shaft of the rotary motor.

According to another feature of the invention, the blocking unit can be a silent ratchet comprising a controllable gripping jaw. Preferably, the gripping jaw can be clamping wheel.

According to yet another feature of the invention, the blocking unit can be a friction brake, which is disposed at the dive shaft of the rotary motor.

According to a further feature of the invention, the rotary motor acts as drive motor for a spindle drive or a toggle joint drive of the closing unit.

According to yet another feature of the present invention the blocking unit can be actuated via a control member that is switched on by the door position switch when the door is in an open position.

According to another feature of the present invention, the blocking unit can be actuated via a control member that can be controlled through the machine control.

According to another feature of the present invention, the protective door includes a pawl for engagement into a locking position with a toothed ratchet, when the door is in open position.

BRIEF DESCRIPTION OF THE DRAWING

Other features and advantages of the present invention will be more readily apparent upon reading the following description of currently preferred exemplified embodiments of the invention with reference to the accompanying drawing, in which:

FIG. 2 is a side view of a highly schematic representation of a safety device according to the present invention.

FIG. 3 is a top view of the blocking unit according to FIG. 2 taken along arrow A.

DETAILED DESCRIPTION OF PREFERRED EMBODIMENTS

Figure 1:
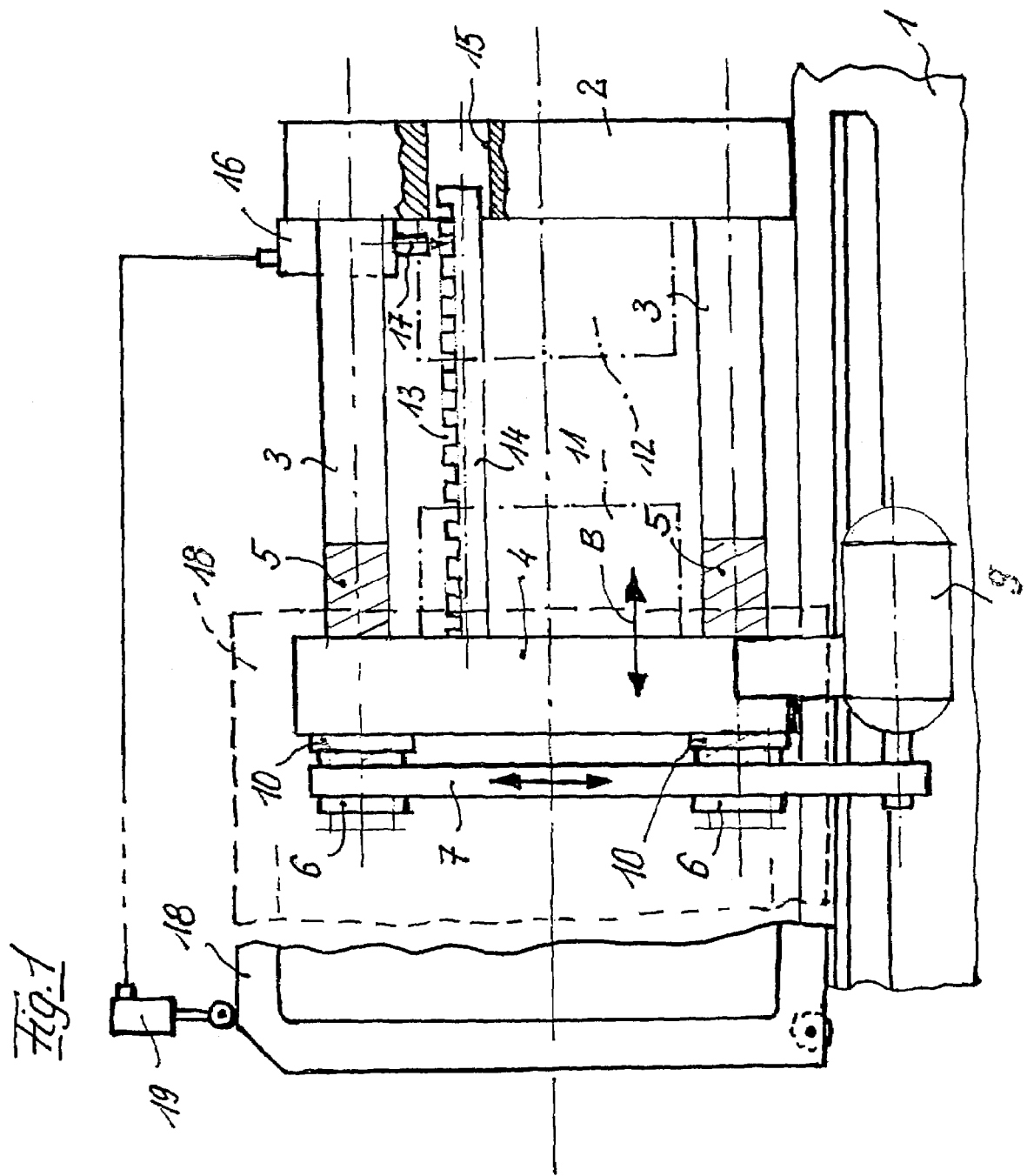
FIG. 1 is a highly schematic representation according to the present invention with a safety device according to the prior art.

Throughout all the Figures, same or corresponding elements are generally indicated by same reference numerals. These embodiments shown are to be understood as illustrative of the invention and not as limiting in any way.

Turning now to the drawing, and in particular to FIG. 1, there is shown a side view of a two mold plate closing unit of an injection molding machine in accordance with the prior art. The closing unit includes a mold mounting plate 2 which is mounted on machine bed 1 in a stationary manner and in which four columns 3 are disposed. The ends of the columns 3 facing away from the stationary mold mounting plate 2 penetrate the movable mold mounting plate 4 and are configured as threaded spindles 5. In conjunction with spindle nuts 6, the threaded spindles 5 form a spindle drive for moving the movable mold mounting plate 4 into opening and closing directions as indicated by arrow B. The spindle nuts 6 are driven by a rotary motor 9 via a toothed belt or a toothed chain 7. The motor 9 is attached to the movable mold mounting plate. Motor 9 can also be an electric motor or a hydraulic motor.

The two mold halves 11 and 12, are each mounted to one of the two mold mounting plates 2 and 4, which is shown in FIG. 1 in broken lines.

Attached to the movable mold mounting plate 4 is a locking bar 14, which is provided with toothed notches 13 and projects through an opening 15 into the stationary mold mounting plate 2. As seen in FIG. 1, in the area of the opening 15, a control member 16 is secured to the stationary mold mounting plate 2, and operatively connected to a pawl, which can be brought into and out of engagement with the toothed notches 13 of the locking bar 14 for a locking, respectively an unlocking position. The locking bar 14 and opening 15 are disposed outside the mounting area of the mold halves 11 and 12 and in the marginal area of the mold mounting plates 2 and 4.

A protective door 18 covering the closing unit is disposed at the machine bed 1 in a movable manner. In FIG. 1, the protective door 18, depicted here partially only in sketched form, is shown in an open position, whereby the space between the mold mounting plates 2 and 4 becomes accessible and from which position, a switch 19 in the upper left hand edge of protective door 18 is switched, to activate the control member 16 by means of a control signal, so that in an open position of protective door 18, the pawl 17 engages in one of the toothed notches 13 of the locking bar 14. When in this operational position, the closing unit is secured against inadvertent closure.

The closing unit as illustrated in FIG. 2 with protective door 18, corresponds in some respects to the closing unit according to FIG. 1 but differs in that it does not include the locking bar 14 and the control member 16 with a pawl 17 and showing possible locations for a toggle joint, a clamping locking mechanism and a friction brake. Otherwise the same reference numerals refer to the same structures as also referred to in FIG. 1.

FIGS. 2 and 3 illustrate a safety device according to the present invention, wherein the drive shaft 20 of rotary motor 9 includes a ratchet wheel 22 having toothed notches 21, and wherein under control of control member 23, a pawl 24 can be brought into and out of engagement with the toothed notches 21. Control member 23 is activated by the positional signals by positional switch 19. During the operational phase illustrated in FIG. 2, the protective door 18 is in open position as seen in FIG. 2, from where the control member 21 is controlled by the positional switch 19 in such a way, that the pawl 24 engages in one of the toothed notches 21 of ratchet wheel 22 to thereby block the entire drive unit of the 2 mold mounting plate unit. In this drive position, the closing unit is secured against inadvertent closure.

Figure 4:
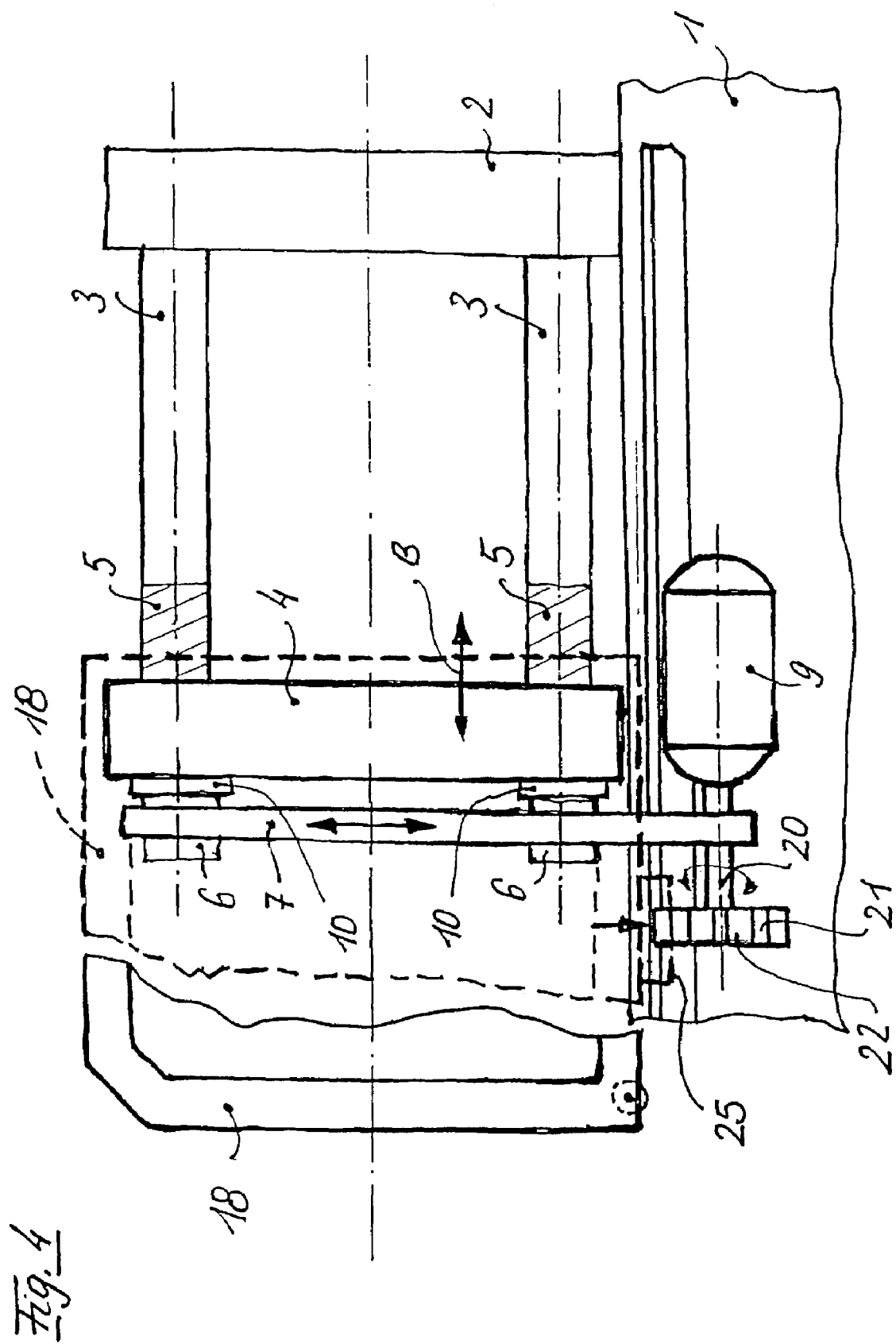
FIG. 4 shows an alternative safety device according to the present invention with a pawl disposed at the protective door shown in engagement with the ratchet wheel of the drive motor.

The embodiment according to FIG. 4 corresponds in some respects to the embodiment shown in FIGS. 2 and 3, but is different in that it does not include the positional switch 19 and the control member 23 with pawl 24. Otherwise, the same reference numerals refer to the same structures as referred to also in FIGS. 2 and 3.

In accordance with FIG. 4, a pawl 25 is secured to the protective door 18 shown in open position in which the pawl 25 is in locking engagement with the toothed notch 21 of ratchet wheel 22, to thereby effect blocking of the drive unit of the closing unit.

The direct-action safety device as illustrated here refers only to one preferred embodiment, however it should be noted, that other embodiments are possible in which in open position, the protective door 18 mechanically activates pawls that engage in the toothed notches of functional members in a locking manner.

While the invention has been illustrated and described in connection with currently preferred embodiments shown and described in detail, it is not intended to be limited to the details shown since various modifications and structural changes may be made without departing in any way from the spirit of the present invention. The embodiments were chosen and described in order to best explain the principles of the invention and practical application to thereby enable a person skilled in the art to best utilize the invention and various embodiments with various modifications as are suited to the particular use contemplated.

What is claimed is:

1. A safety device for safeguarding a closing unit of an injection molding machine from inadvertently executing a closing movement, said safety device comprising:
   a mechanical blocking unit, interacting with a drive unit for opening and closing the closing unit, said blocking unit disposed outside a space between mold mounting plates of the closing unit; and
   an activation mechanism automatically operating the blocking unit, when a protective door to the closing unit is opened for securement of the mold mounting plates of the closing unit in an open position.

2. The device of claim 1, wherein the drive unit is a rotary motor having a drive shaft, said blocking unit mounted to the drive shaft of the rotary motor.

3. The device of claim 1, wherein the blocking unit includes a ratchet mechanism with a controllable pawl.

4. The device of claim 3, wherein the drive unit is a rotary motor having a drive shaft, said ratchet mechanism including a ratchet wheel mounted to the drive shaft of the rotary motor.

5. The device of claim 1, wherein the blocking unit includes a clamping locking mechanism with controllable clamping jaws.

6. The device of claim 5, wherein the drive unit is a rotary motor having a drive shaft, said locking mechanism including a clamping wheel, which is mounted to the drive shaft of the rotary motor.

7. The device of claim 1, wherein the blocking unit is a friction brake.

8. The device of claim 7, wherein the drive unit is a rotary motor having a drive shaft, said friction brake mounted to the dive shaft of the rotary motor.

9. The device of claim 2, wherein the drive unit is a spindle drive, with the rotary motor representing a drive motor of the spindle drive.

10. The device of claim 2, wherein the drive unit is a toggle joint drive, with the rotary motor representing a drive motor of the toggle joint drive.

11. The device of claim 1, wherein the activating mechanism includes a control member, operatively connected to the blocking unit, and a position switch addressing the control member, when the protective door is opened.

12. The device of claim 1, wherein the activating mechanism includes a control member, operatively connected to the blocking unit, and a control system provided for the injection molding machine and addressing the control member.

13. The device of claim 3, wherein the protective door is provided with a pawl, for engaging a ratchet, when the protective door is opened to thereby secure the protective door in opened position.

* * * * *